(12) United States Patent
Whiting et al.

(10) Patent No.: US 6,347,619 B1
(45) Date of Patent: Feb. 19, 2002

(54) EXHAUST GAS RECIRCULATION SYSTEM FOR A TURBOCHARGED ENGINE

(75) Inventors: Todd Mathew Whiting, Waterloo; James Alan Eng, Jr., Cedar Falls, both of IA (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 09/537,358

(22) Filed: Mar. 29, 2000

(51) Int. Cl.$^7$ ................................................ F02B 47/08
(52) U.S. Cl. .................... 123/568.12; 123/568; 123/563
(58) Field of Search ....................... 123/568.21, 568.2, 123/568.11, 568.12, 568.15, 568.18, 568.28, 540, 563; 60/605.2

(56) References Cited

U.S. PATENT DOCUMENTS

| | | | |
|---|---|---|---|
| 4,179,892 A | * 12/1979 | Heydrich | 60/605 |
| 5,058,614 A | 10/1991 | Plohberger et al. | 137/1 |
| 5,203,311 A | * 4/1993 | Hitomi et al. | 123/570 |
| 5,515,818 A | 5/1996 | Born | 123/90.11 |
| 5,611,203 A | * 3/1997 | Henderson et al. | 60/605.2 |
| 5,746,189 A | * 5/1998 | Kuzuya et al. | 123/568 |
| 5,802,846 A | 9/1998 | Bailey | 60/278 |
| 5,927,075 A | * 7/1999 | Khair | 60/605.2 |
| 5,987,884 A | * 11/1999 | Kibe et al. | 60/286 |
| 6,003,315 A | 12/1999 | Bailey | 60/605.2 |
| 6,009,709 A | 1/2000 | Bailey | 60/605.2 |

* cited by examiner

Primary Examiner—Henry C. Yuen
Assistant Examiner—Mahmoud Gimie

(57) ABSTRACT

Exhaust gas recirculation is provided in a turbocharged diesel engine by adding a separate EGR manifold and a secondary exhaust valve for each combustion chamber that permits passage of exhaust gas from the combustion chamber to the EGR manifold. The secondary exhaust valve is opened during the expansion stroke of the engine cycle and sometime after the combustion process has been completed while the pressure in the combustion chamber is still greater than the pressure in the intake manifold. One or two EGR valves can be opened to admit the high pressure exhaust gas from the EGR manifold into the intake manifold. Decompression braking can be provided by an additional valve between the EGR manifold and the exhaust manifold that is opened to dump the gas from the EGR manifold to the exhaust manifold while the secondary exhaust valve in the cylinder head is opened at the beginning of the expansion stroke of the piston whereby the compressed air in the cylinder escapes before performing work on the piston.

22 Claims, 4 Drawing Sheets

EXHAUST GAS RECIRCULATION SYSTEM FOR A TURBOCHARGED ENGINE

BACKGROUND OF THE INVENTION

1. Field of the Invention

The present invention relates to an exhaust gas recirculation (EGR) system for a turbocharged, internal combustion engine.

2. Description of the Related Art

Exhaust gas recirculation is well known for internal combustion engines where part of the exhaust gas discharged from an engine is recirculated to the intake passage and injected back into the combustion chambers, along with air and fuel, to decrease the combustion temperature thereby reducing the amount of nitrogen oxides in the exhaust gas.

Two principle means of implementation of exhaust gas recirculation have been suggested for application to turbocharged diesel engines. In the first method, known as "low-pressure" loop, exhaust gas is routed from the turbine outlet to the compressor inlet. This method suffers from the drawbacks of fouling the compressor wheel and housing with exhaust deposits, possible overheating of the compressor wheel and the potential for severe fouling of the air-to-air charge air cooler. In the second method, known as "high-pressure" loop, exhaust gas is routed from the exhaust manifold, before the turbocharger turbine, directly into the engine's intake manifold (thereby eliminating the fouling potential of the low-pressure loop). This method suffers from the drawback that the pressure in the exhaust manifold must be greater than the pressure in the intake manifold. Most well-developed, heavy-duty, turbocharged diesel engines operate with intake manifold pressures that are higher than the exhaust manifold pressures. This partially accounts for the diesel engines' excellent fuel economy characteristics. To cause the engine's exhaust pressure to be higher than the intake pressure requires that a relatively inefficient turbocharger configuration be fitted to the engine or a back pressure device be fitted following the turbocharger's turbine stage to cause the exhaust pressure to be higher than the intake manifold pressure. Poor fuel economy will be expected for either of these types of high-pressure loop arrangements.

SUMMARY OF THE INVENTION

The EGR system of the present invention uses a high-pressure loop in a manner that enables the intake manifold pressure to remain higher than the exhaust manifold pressure. This is accomplished by adding a separate EGR manifold and an additional exhaust valve for each combustion chamber, referred to herein as a 'secondary exhaust valve', that permits passage of exhaust gas from the combustion chamber to the EGR manifold. The secondary exhaust valve can be actuated by a mechanical, hydromechanical or electro-hydromechanical actuator in such a way that the valve can be opened and closed as a function of the rotational position of the engine's crankshaft. The opening of the secondary exhaust valve occurs during the expansion stroke of the engine cycle, after the combustion process has been completed. The valve is closed at a point near the opening of the primary exhaust valve or valves.

Exhaust gas exits from the EGR manifold to the intake manifold, or other conduit for pressurized air, downstream of the turbocharger compressor. Exhaust gas exit is provided by an EGR valve that is controlled so that a pressure can be created in the EGR manifold and controlled to a higher level than exists at any moment in the intake manifold. The EGR valve can be controlled so that the amount of exhaust gas being fed into the intake manifold can be controlled over a wide range of flow rates as desired for optimum levels of emissions reduction and minimal fuel consumption penalty. The EGR valve is controlled by the engine's ECU (engine control unit).

A decompression brake valve can be provided with the EGR system that connects the EGR manifold and the engine's exhaust manifold. When the decompression brake valve is held open and the EGR valve is closed, the secondary exhaust valve in each combustion chamber can be opened at the beginning of the expansion stroke and closed at the end of the expansion stroke such that engine decompression braking is achieved.

With the EGR system of the present invention, the engine's exhaust manifold and turbocharger can operate in the same type of efficient manner as is characteristic of current turbocharged engines without an EGR system. It is believed that with such a system, the engine will operate with better fuel economy as compared to engines equipped with any of the EGR systems known in the art at this time.

A further feature of the invention provides two EGR valves at the outlet of the EGR manifold. One valve allows the exhaust gas to be directed into the intake manifold without passing through a cooler. This will enable the diesel engine to start at lower ambient temperatures and warm up more quickly than engines without such a controllable exhaust gas recirculation system.

DESCRIPTION OF THE PREFERRED EMBODIMENT

Figure 1:
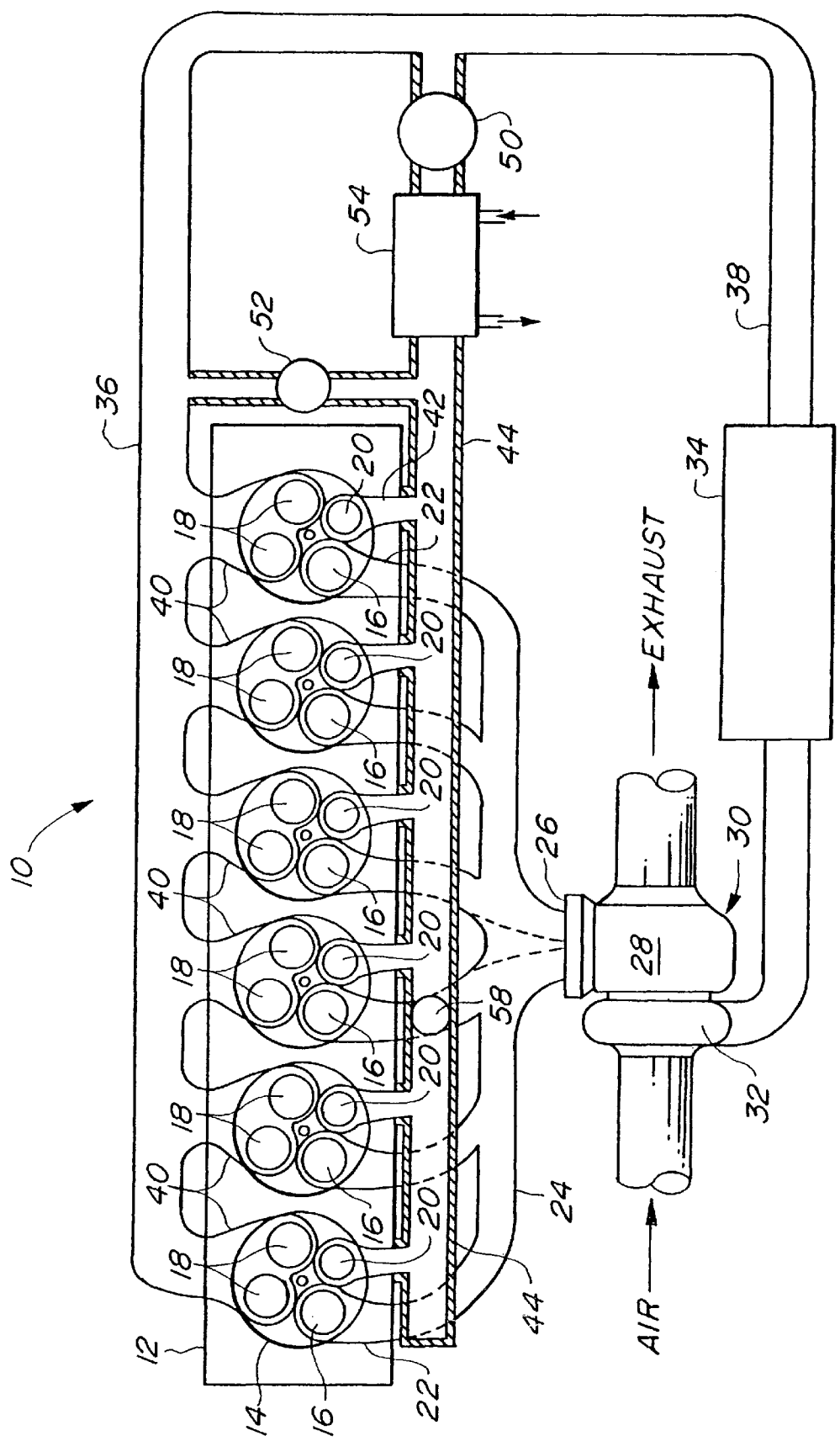
FIG. 1 is a schematic diagram of an engine having the exhaust gas recirculation system of the present invention.

A multi-cylinder turbocharged diesel engine having the exhaust gas recirculation system of the present invention is shown schematically in FIG. 1 and designated generally at 10. The engine 10 includes a cylinder head 12 that contains at least one primary exhaust valve 16, two intake valves 18 and a secondary exhaust valve 20 for each of the cylinders or combustion chambers 14. While the illustrated engine 10 has two intake valves 18 and one primary exhaust valve 16, it will be understood that the EGR system of the present invention can be used with engines having any number of intake and primary exhaust valves.

Exhaust gas flows from each combustion chamber through a primary exhaust port 22 in the cylinder head to an exhaust manifold 24. From there the exhaust gas flows through an exhaust inlet 26 to a turbine 28 of a turbocharger 30. The turbocharger 30 includes an air compressor 32 that delivers fresh air under pressure, through a cooler 34, to an intake manifold 36 through a connecting pipe 38. From the intake manifold 36, the air passes through intake ports 40 in the cylinder head into the combustion chambers 14.

Figure 2:
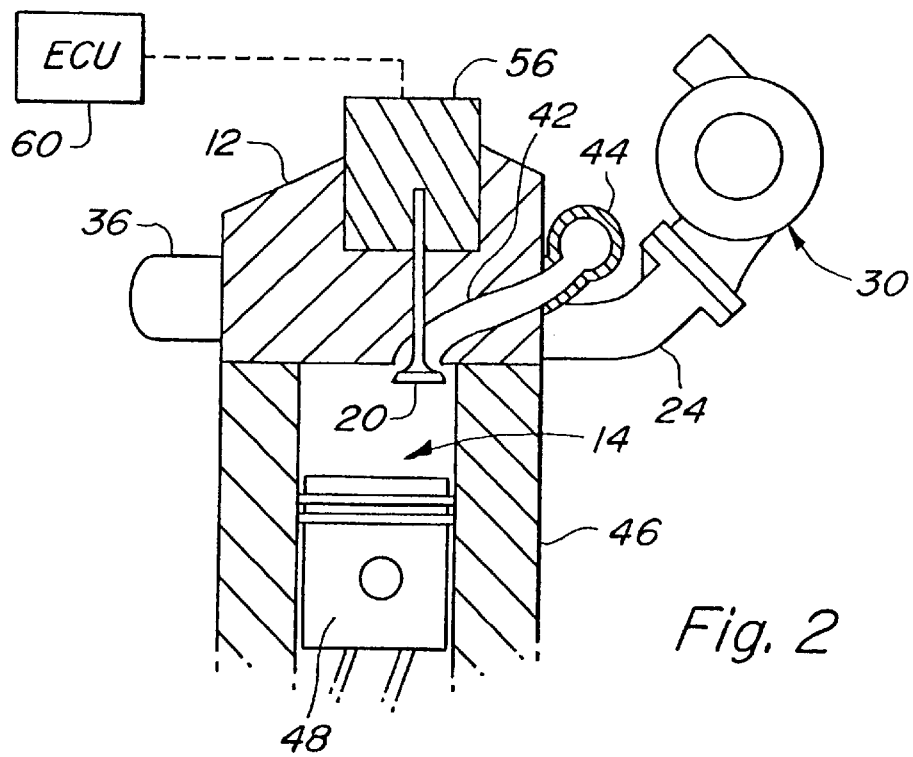
FIG. 2 is a schematic sectional view through the cylinder head and one combustion chamber of the engine shown in FIG. 1.

A secondary flow of exhaust gas from each combustion chamber is created through the secondary exhaust valves 20 and the associated exhaust ports 42 in the cylinder head 12. The flow of exhaust gas through the secondary exhaust valves 20 is accumulated in a second exhaust manifold, referred to herein as an EGR manifold 44. The secondary exhaust valve 20 is shown in FIG. 2 together with the cylinder head, a cylinder block 46 and a piston 48 reciprocal within the cylinder or combustion chamber 14.

With reference once again to FIG. 1, the exhaust gas accumulated in the EGR manifold 44 can be introduced into the intake air flow in the connecting pipe 38 or the intake manifold 36 by operation of either or both of the EGR valves 50 and 52. The EGR valves 50, 52 can one of various known types of EGR valves. They may be on/off valves or linear valves capable of variable gas flow rates depending on the EGR flow control scheme that is utilized. Exhaust gas flowing through the EGR valve 50 also passes through an exhaust gas cooler 54 that is cooled either by air or by the engine coolant. This cools the temperature of the exhaust gas before the exhaust gas is mixed with the intake air.

The EGR system can also be provided with an additional EGR bypass or braking valve 58. The bypass valve 58 is a flow control valve such as a butterfly valve. The valve 58, when opened, allows exhaust gas to pass directly from the EGR manifold 44 to the exhaust manifold 24. The braking valve 58 is used in conjunction with the operation of the secondary exhaust valve 20 and closure of the EGR valves 50 and 52 during the engine operating mode known as 'decompression braking' as described below.

The secondary exhaust valves 20 are actuated by actuators 56 that allow opening and closing of the valves as a function of the rotational position of the engine crankshaft. Furthermore, the engine's electronic control unit (ECU) 60 electronically controls the actuators 56. The valve actuators 56 may be any of various mechanical, hydromechanical or electro-hydromechanical actuators that enable the opening and closing of the secondary exhaust valve to be variably controlled as described below. For example, the actuator 56 may be an electromechanical variable valve actuator of the type shown and described in U.S. Pat. No. 5,515,818 or a hydraulically operated valve actuator of the type shown and described in U.S. Pat. No. 5,058,614. The EGR valves 50 and 52 and the EGR bypass valve 58 are also electronically controlled by the ECU 60. Each of these valves 50, 52, 58 can be independently regulated by the ECU.

Figure 4:
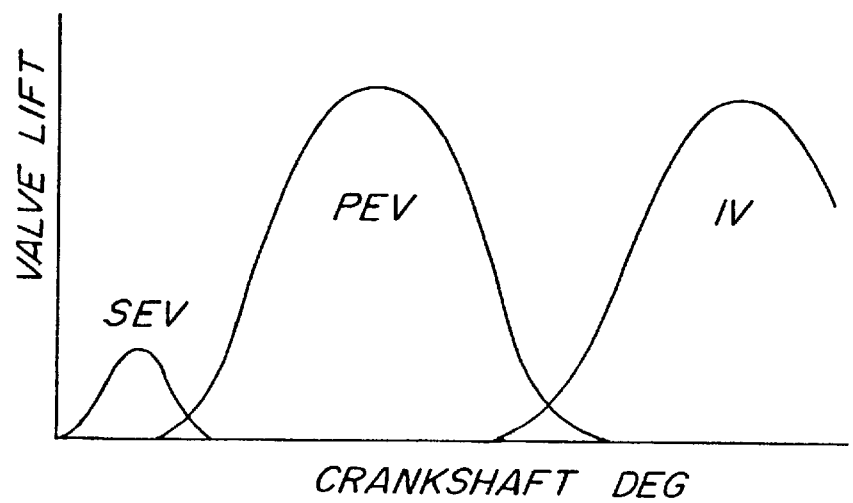
FIG. 4 is a graph of the valve lift versus crankangle for the three different valves of the engine.
Figure 3:
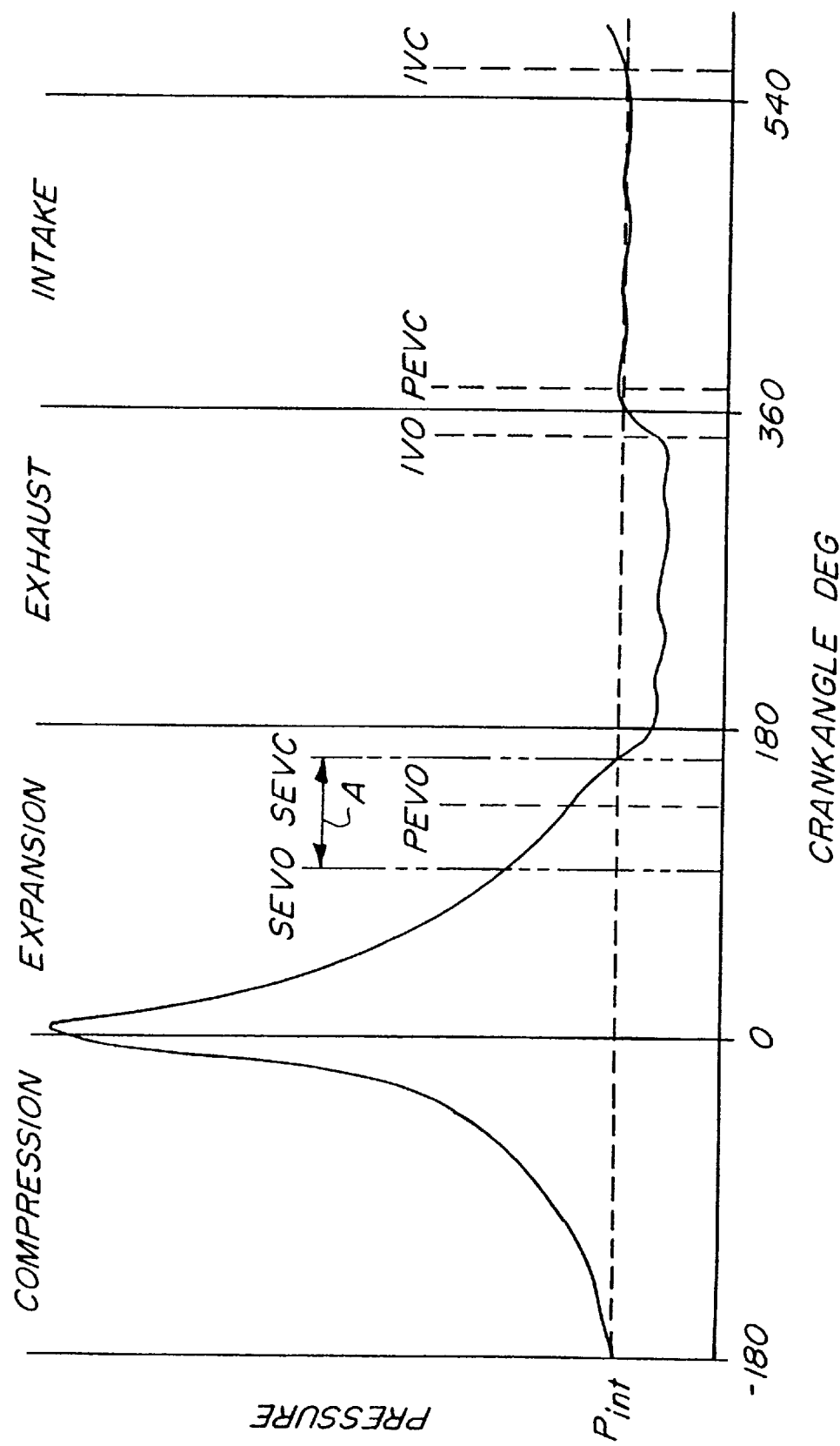
FIG. 3 is a graph of the combustion chamber pressure versus crankangle illustrating the valve opening and closing during exhaust gas recirculation.

In a first engine operating mode, the valves are controlled to achieve exhaust gas recirculation. This results in delivery of exhaust gas from the exhaust system to the engine's intake manifold for mixing with intake air and delivery to the engine's combustion chambers 14. The opening and closing of the secondary exhaust valves 20 is a function of crankshaft position as shown in FIG. 3. Opening of the secondary exhaust valve 20 occurs during the expansion stroke of the engine cycle; i.e., while the piston 48 is moving downward toward what is described in the art as the bottom dead center position. This is shown in FIG. 3 by the two vertical lines designated 'SEVO' for 'secondary exhaust valve opening' and 'SEVC' for 'secondary exhaust valve closing.' The secondary exhaust valves are open during the range of crank angles labeled A. The secondary exhaust valve is opened prior to the opening of the primary exhaust valve(s) 16. The secondary exhaust valve is open when the pressure of the exhaust gas in the cylinder is greater than the pressure in the intake manifold as shown by the horizontal line $P_{int}$ in FIG. 3. The opening and closing of the primary exhaust valve is designated by the lines 'PEVO' and 'PEVC' while the opening and closing of the intake valve is designated by the lines 'IVO' and 'IVC.' The valve lift of all three valves is shown in FIG. 4.

The secondary exhaust valve 20 will be held open a specified amount of time and then be closed by the ECU. In relation to the opening of the primary exhaust valve, closing of the secondary exhaust valve can be as shown in FIG. 3 in which the secondary exhaust valve closes after the opening of the primary exhaust valve, or the secondary exhaust valve can close at the same time or prior to the opening of the primary exhaust valve. Flow of exhaust gas from the combustion chamber to the EGR manifold 44 may continue during the period of time while the secondary exhaust valve is opened or exhaust gas may cease flowing if the instantaneous pressure in the manifold 44 equals the instantaneous pressure in the combustion chamber.

The ECU also controls the opening and closing of the EGR valves 50 and 52 as well as the EGR bypass or braking valve 58. The position of the valves 50, 52, 58 can be programmed in such a way that a pressure is created, maintained and controlled in the EGR manifold 44. The pressure created in the manifold 44 will be dependant on the rate of gas entering the manifold versus the rate at which gas is allowed to exit the manifold based on the instantaneous positions of the valves 50, 52, 58. By maintaining a pressure in the EGR manifold that is greater than the intake manifold pressure, exhaust gas will flow into the intake manifold when one or both of the EGR valves 50, 52 are opened.

During the exhaust gas recirculation operating mode, the EGR bypass valve 58 is held in the closed position to prevent the flow of exhaust gas from the EGR manifold 44 to the exhaust manifold 24. In the first case of implementation of exhaust gas recirculation, without use of EGR cooler 54, the EGR valve 50 is held in the closed position. The pressure in the EGR manifold 44 is controlled by the ECU by control of the position of the EGR valve 52. The valve 52 allows the exhaust gas to bypass the cooler 54 for cold temperature starting and for a faster engine warm-up. The EGR valve 52 is thus also known as the cold start EGR valve. In the second case of implementation of exhaust gas recirculation, including the use of exhaust gas cooler 54, the EGR valve 52 is held in the closed position. The pressure in the EGR manifold 44 is controlled by the ECU by control of the position of the EGR valve 50.

Figure 5:
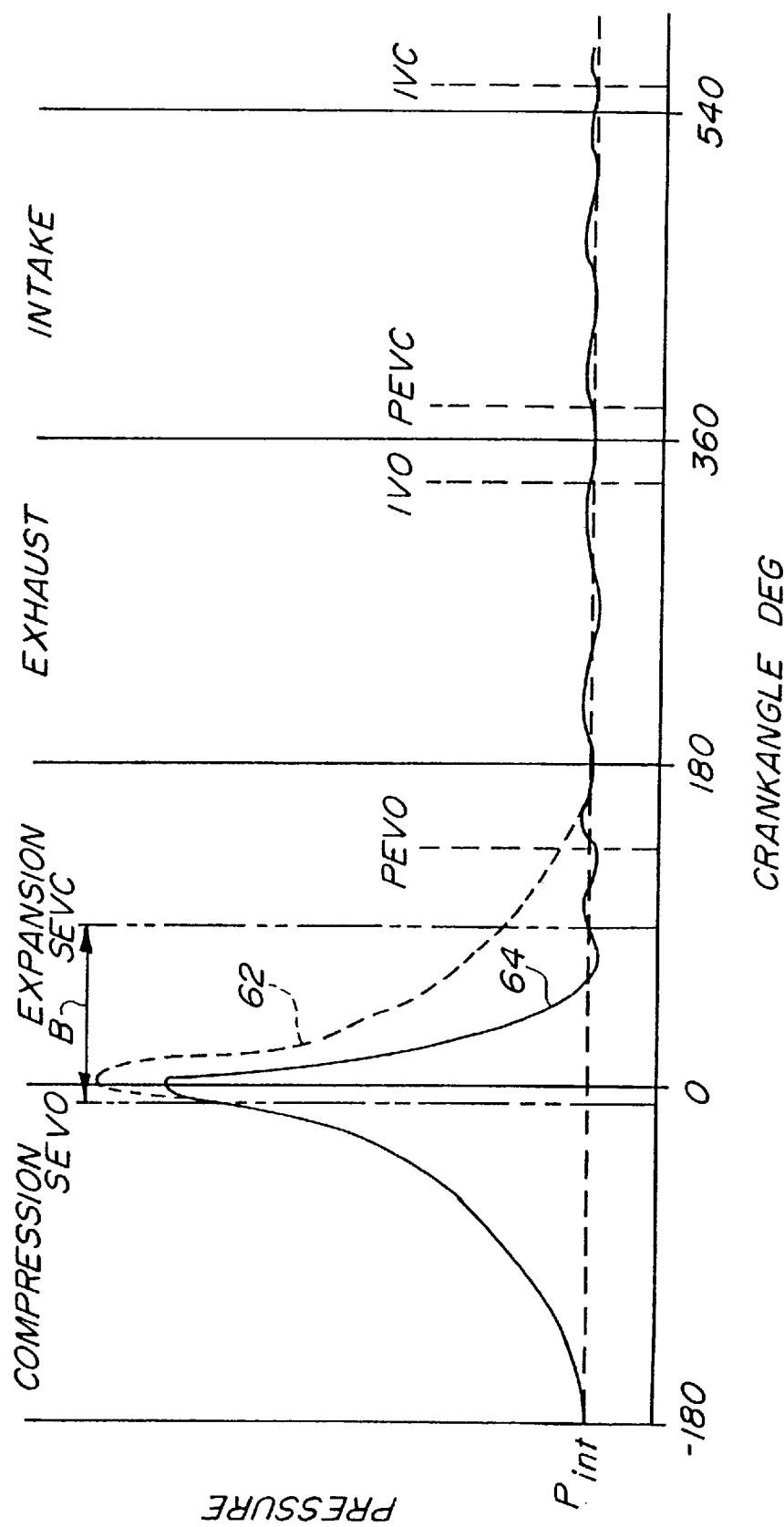
FIG. 5 is a graph of the combustion chamber pressure versus crankangle illustrating the valve opening and closing during decompression braking.

In a second engine operating mode, the valves are controlled to achieve decompression braking. Implementation of decompression braking is accomplished by holding both the EGR valves 50, 52 in the closed position while the EGR bypass or braking valve 58 is held in the open position. The secondary exhaust valve 20 for each cylinder is then opened and closed as a function of rotational position of the crankshaft as shown in FIG. 5, in the range B. Opening of the secondary exhaust valve occurs at a rotational position of the crankshaft corresponding near to the "top dead center" position of the piston travel at the end of the compression stroke.

Closing of the secondary exhaust valves 20 is controlled by the ECU to occur nearer to the bottom dead center position of the piston's travel. The opening and closing action of the secondary exhaust valve 20 will cause the pressure built up in the cylinder during the engine's compression stroke to be expelled through the EGR manifold 44 to the exhaust manifold 24 before the gas can be expanded in the combustion chamber. Thus, the amount of work done by the piston to compress the gas during the engine's compression stroke greatly exceeds the amount of work done by the gas on the piston during the engine's expansion stroke, thereby resulting in the ability of the engine to absorb a significant amount of kinetic energy.

In FIG. 5, the dashed line 62 shows a typical combustion chamber pressure during normal motoring operation of the engine. The solid line 64 illustrates the combustion chamber pressure during the decompression braking operating mode. The closing of the secondary exhaust valves 20 can occur anytime during the expansion stroke after the combustion chamber pressure has dropped to or below the intake manifold pressure. This may occur before the bottom dead center position of the piston.

Electronic control of the secondary exhaust valves 20 enable the opening and closing of the secondary exhaust valves to occur at different times in the engine cycle based on the engine operating mode. Furthermore, the timing of the opening and closing of the secondary exhaust valves 20 during EGR operation can be varied to optimize the emissions reduction while minimizing the fuel consumption penalty.

The EGR system of the present invention enables the engine to be controlled for optimum emissions reduction while minimizing the fuel consumption penalty. The disadvantages of prior EGR systems for turbocharged diesel engines have been avoided. The EGR system of the present invention may also be applicable to turbocharged spark-ignition engines as well.

The invention should not be limited to the above-described embodiment, but should be limited solely by the claims that follow.

We claim:

1. An internal combustion engine having multiple cylinders comprising:
    a cylinder head having intake and exhaust ports therein;
    at least one intake valve for each cylinder and at least one primary exhaust valve for each cylinder;
    an exhaust manifold in fluid communication with the exhaust ports for receiving exhaust gas therefrom;
    a turbocharger having an exhaust inlet coupled to the exhaust manifold for receiving exhaust gas therefrom and a turbine powered by the exhaust gas, the turbocharger further having an air inlet, an air compressor driven by the turbine and a compressed air outlet;
    an intake manifold in fluid communication with the compressed air outlet and the intake ports in the cylinder head for receiving and directing the compressed air to the cylinder head; and
    an exhaust gas recirculation (EGR) system comprising:
        a secondary exhaust port in the cylinder head for each cylinder;
        a secondary exhaust valve for each cylinder for admitting exhaust gas into the secondary exhaust port when open;
        an EGR manifold in fluid communication with the secondary exhaust ports and the intake manifold through an EGR valve to recirculate exhaust gas to the intake manifold; and
        a valve actuator opening the secondary exhaust valve during the expansion stroke of each cylinder when the pressure in the respective cylinder is greater than the pressure in the intake manifold and closing the secondary exhaust valve later in the expansion stroke.

2. The engine as defined by claim 1 wherein the valve actuator closes the secondary exhaust valve after the primary exhaust valve is opened.

3. The engine as defined by claim 1 further comprising an electronic control unit (ECU) and wherein the valve actuator is electronically controlled by the ECU.

4. The engine as defined by claim 3 wherein timing of the operation of the valve actuator to open and close the secondary exhaust valve can by varied by the ECU.

5. The engine as defined by claim 1 further comprising an EGR bypass valve operable when open to permit flow of exhaust gas from the EGR manifold to the exhaust manifold.

6. The engine as defined by claim 1 further comprising a cooler upstream of the EGR valve to cool recirculated exhaust gas.

7. The engine as defined by claim 6 further comprising a cold start EGR valve between the EGR manifold and the intake manifold operable to bypass the cooler when open.

8. The engine as defined by claim 1 further comprising:
    an EGR bypass valve operable when open to permit flow of exhaust gas from the EGR manifold to the exhaust manifold;
    a cooler upstream of the EGR valve to cool recirculated exhaust gas;
    a cold start EGR valve between the EGR manifold and the intake manifold operable to bypass the cooler when open; and
    an electronic control unit (ECU) operable to control the opening and closing of the secondary exhaust valve through the valve actuator, and operable to control the opening and closing of the EGR valve, the cold start EGR valve and the EGR bypass valve.

9. The engine as defined by claim 8 wherein timing of the operation of the valve actuator to open and close the secondary exhaust valve can by varied by the ECU.

10. The engine as defined by claim 9 wherein the ECU is operable to effect an engine decompression braking mode of operation by closing the EGR valve and the cold start EGR valve while opening the EGR bypass valve and opening the secondary exhaust valve during the expansion stroke of an associated piston.

11. The engine as defined by claim 1 wherein the engine is a diesel engine.

12. A method of recirculating exhaust gas in a turbocharged internal combustion engine having multiple cylinders, a cylinder head, at least one intake valve and at least one exhaust valve for each cylinder, and an intake manifold between the turbocharger and the cylinder head, the method comprising the steps of:
    diverting a flow of exhaust gas from the cylinders to an exhaust gas recirculation (EGR) manifold by opening and closing a secondary exhaust valve in each cylinder during the expansion stroke in each cylinder; and
    directing the diverted flow of exhaust gas from the EGR manifold to the intake manifold through an EGR valve.

13. The method as defined by claim 12 further comprising the step of cooling the diverted flow of exhaust gas before directing the diverted flow of exhaust gas to the intake manifold.

14. The method as defined by claim 12 further comprising the step of controlling the opening and closing of the secondary exhaust valve through an engine electronic control unit (ECU).

15. The method as defined by claim 14 wherein timing of the opening and closing of the secondary exhaust valve is variable by the ECU.

16. The method as defined by claim 14 further comprising the step of controlling the opening and closing of the EGR valve by the ECU.

17. A method of decompression braking of a turbocharged multiple cylinder internal combustion engine having a cylinder head with intake and exhaust ports therein, at least one intake valve for each cylinder and at least one primary exhaust valve for each cylinder, an exhaust manifold, an intake manifold, a secondary exhaust port in the cylinder head for each cylinder, a secondary exhaust valve for each cylinder for admitting exhaust gas into the secondary exhaust port when open, and an EGR manifold in fluid communication with the secondary exhaust ports and the intake manifold through an EGR valve to recirculate exhaust gas to the intake manifold, the method of decompression braking comprising the steps of:

diverting exhaust gas from the EGR manifold to the exhaust manifold;

opening the secondary exhaust valve of each cylinder near the beginning of the expansion stroke for the cylinder; and holding each secondary exhaust valve open until later in the expansion stroke.

18. The method as defined by claim 17 comprising the step of controlling the opening and closing of the secondary exhaust valve by an engine electronic control unit.

19. A method of operating a turbocharged internal combustion engine having multiple cylinders in either an exhaust gas recirculation (EGR) mode or an engine decompression braking mode, the engine having a cylinder head, at least one intake valve and at least one primary exhaust valve for each cylinder, an intake manifold between the turbocharger and the cylinder head and an exhaust manifold between the cylinder head and the turbocharger, the method comprising the steps of:

operating the engine in the EGR mode by diverting a flow of exhaust gas from the cylinders to an EGR manifold by opening and closing a secondary exhaust valve in each cylinder during the expansion stroke in each cylinder; and directing the diverted flow of exhaust gas from the EGR manifold to the intake manifold through an EGR valve; and operating the engine in the decompression braking mode by diverting exhaust gas from the EGR manifold to the exhaust manifold;

opening the secondary exhaust valve of each cylinder near the beginning of the expansion stroke for the cylinder; and holding each secondary exhaust valve open until later in the expansion stroke.

20. The method as defined by claim 19 wherein exhaust gas is diverted from the EGR manifold to the exhaust manifold by opening of an EGR bypass valve connecting the EGR manifold to the exhaust manifold closing the EGR valve.

21. The method as defined by claim 20 comprising the step of controlling the opening and closing of the secondary exhaust valve, the EGR valve and the EGR bypass valve by an engine electronic control unit.

22. An internal combustion engine having multiple cylinders comprising:

a cylinder head having intake and exhaust ports therein;

an exhaust manifold in fluid communication with the exhaust ports for receiving exhaust gas therefrom;

an intake manifold in fluid communication with the intake ports in the cylinder head for directing air to the cylinder head; and an exhaust gas recirculation (EGR) system comprising:

an exhaust gas conduit connecting the exhaust manifold to the intake manifold;

a cooler in the exhaust gas conduit to cool exhaust gas before delivery of the exhaust gas to the intake manifold;

a first EGR valve in the exhaust gas conduit to regulate the flow of exhaust gas from the exhaust manifold through the cooler and to the intake manifold; and a bypass conduit including a bypass EGR valve between the exhaust manifold and the intake manifold operable to deliver exhaust gas to the intake manifold without passing the exhaust gas through the cooler.

* * * * *